US 6,586,107 B2
Jul. 1, 2003

(12) United States Patent
Klug et al.

(10) Patent No.: US 6,586,107 B2
(45) Date of Patent: Jul. 1, 2003

(54) MICROCAPSULES HAVING POLYUREA WALLS

(75) Inventors: Günter Klug, Langenfeld (DE); Jürgen Weisser, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/976,300

(22) Filed: Oct. 11, 2001

(65) Prior Publication Data

US 2002/0064656 A1 May 30, 2002

(30) Foreign Application Priority Data

Oct. 16, 2000 (DE) .......................................... 100 51 190

(51) Int. Cl.$^7$ ................................................. B01J 13/02
(52) U.S. Cl. ...................... 428/488.1; 264/4.1; 264/4.3; 264/4.33; 264/4.7; 428/402.21; 528/68; 528/73; 523/201; 524/801
(58) Field of Search .......................... 264/4.1, 4.3, 4.33, 264/4.7; 428/402.21, 488.1; 528/68, 73; 523/201; 524/801

(56) References Cited

U.S. PATENT DOCUMENTS

| 4,668,580 | A | 5/1987 | Dahm et al. ........... 428/402.21 |
| 4,738,898 | A | 4/1988 | Vivant ................... 428/402.21 |
| 4,761,255 | A | 8/1988 | Dahm et al. ................. 264/4.7 |
| 4,783,196 | A | 11/1988 | Eckstein et al. ................ 8/527 |
| 4,831,141 | A | 5/1989 | Berneth et al. ................ 544/90 |
| 4,835,270 | A | 5/1989 | Berneth ........................ 544/73 |
| 4,923,641 | A | 5/1990 | Eckstein et al. ............... 544/86 |
| 5,017,707 | A | 5/1991 | Berneth et al. .............. 548/455 |
| 5,164,126 | A | 11/1992 | Kalishek et al. ............. 264/4.7 |
| 5,225,118 | A | 7/1993 | Juang et al. .................. 264/4.7 |
| 5,401,443 | A | 3/1995 | Nagano et al. ............... 264/4.7 |
| 5,421,870 | A | 6/1995 | Scartazzini et al. ........ 106/21 R |
| 5,635,211 | A | 6/1997 | Neben et al. ................ 424/489 |
| 5,643,506 | A | 7/1997 | Rourke ........................ 264/4.1 |
| 6,020,066 | A | * | 2/2000 | Weisser et al. ............... 264/4.1 |

FOREIGN PATENT DOCUMENTS

| DE | 196 23 566 | 6/1996 |
| EP | 0 780 154 | 6/1997 |

* cited by examiner

*Primary Examiner*—Samuel A. Acquah

(57) ABSTRACT

The invention relates to microcapsules for which the walls comprise reaction products of polyisocyanates with guanidine compounds and amines.

11 Claims, No Drawings

MICROCAPSULES HAVING POLYUREA WALLS

BACKGROUND OF THE INVENTION

The present invention relates to microcapsules having walls comprising polyurea obtained by reaction of polyisocyanates, guanidine compounds, and amines, to processes for producing these microcapsules, and to the carbonless copy papers produced from the microcapsules.

Carbonless copy papers are coated on their back with a layer of microcapsules. The microcapsules contain a solution in oil of a color former, so called because it is capable, in the presence of acidic developers, of effectuating a change in color from colorless to colored within a few seconds.

When a capsule-coated paper, then, is placed on a developer-primed paper in such a way that the capsules are in direct contact with the developer, a colored image will appear on the developer side upon writing on the back of the capsuled paper, causing the capsules to burst under the pressure of the writing implement and to release the color former.

In one version of this process, papers coated with capsules are directly aftercoated with a developer layer (to provide two-layer self-contained paper) or capsules are directly mixed with developer and coated onto paper (to provide single-layer self-contained paper). In the case of these SC papers, an image can be created directly on the coated side by mechanical pressure, for example, by placing a sheet of uncoated paper on top and writing on it.

Carbonless copy papers are used worldwide, differing essentially only in the nature of the microcapsule wall used. Customary are gelatin, melamine-formaldehyde, and polyurethane or polyurea capsules. Polyurea capsules are customarily formed by an interfacial polyaddition process, the basic traits of which will now be outlined.

Generally, a suitable color former is dissolved in an oil by heating and a polyisocyanate is added. In addition, an aqueous solution of a protective colloid, for example, polyvinyl alcohol, is prepared. An emulsifying apparatus is then used to convert the oil and water phases into a fine oil-in-water emulsion for which the particle size is substantially equal to the average diameter of the desired capsules.

In a concurrent or subsequent operation, this emulsion is admixed with an aqueous solution of an amine or an amine-like substance (hereinafter referred to as "crosslinker"), which causes a rapid reaction of oil-dissolved isocyanate to take place at the oil/water phase boundary, to form a thin polyurea film. This polyaddition can be made virtually quantitative by supplying heat and allowing appropriate time for reaction. This process is known as an interfacial process. The end result obtained is isocyanate-free oil droplets dispersed in water which are surrounded by a resilient polyurea wall and are known as microcapsules. Typical processes of this kind and capsules resulting therefrom are described, for example, in U.S. Pat. No. 5,225,118, U.S. Pat. No. 5,164,126, EP-A 780,154, U.S. Pat. No. 5,635,211, U.S. Pat. No. 5,643,506, and EP-A 535,384.

The prior art production of microcapsules having polyurea walls by an interfacial process requires a hydrophobic oil phase containing a polyisocyanate as primary wall former. The thickness of the later capsule wall is directly proportional to the fraction of the primary wall former, i.e. the polyisocyanate.

EP-A-727 251 (counterpart of U.S. Pat. No. 5,635,211) describes microcapsules that are prepared using crosslinkers containing guanidine compounds and have a good performance profile. The stability of these microcapsules is now to be improved further. Especially when used for preparing self-contained papers, the microcapsules come into direct contact with the developer and have to have high stability, especially tightness. Otherwise, the capsules will become inadvertently damaged during the manufacture of such papers, releasing the color former and staining the paper.

Overcoming such deficiencies is an object of the present invention.

SUMMARY OF THE INVENTION

This object is achieved by microcapsules for which the walls comprise reaction products of polyisocyanates with guanidine compounds and amines.

DETAILED DESCRIPTION OF THE INVENTION

The guanidine compounds and amines are used as crosslinkers.

Useful guanidine compounds for producing microcapsules according to this invention include, for example, guanidine compounds of the formula (I)

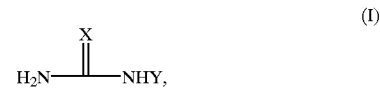

where

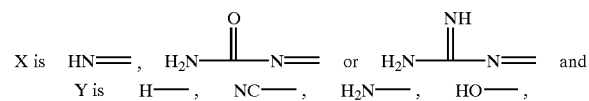

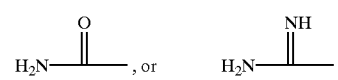

or their salts with acids.

The salts may be, for example, salts of carbonic acid, nitric acid, sulfuric acid, hydrochloric acid, silicic acid, phosphoric acid, formic acid, and/or acetic acid. Salts of guanidine compounds of the formula (I) may be used in combination with inorganic bases in order that the free guanidine compounds of the formula (I) may be obtained from the salts in situ. Useful inorganic bases for this purpose include, for example, alkali metal and/or alkaline earth metal hydroxides and/or alkaline earth metal alkoxides. Preference is given to aqueous solutions or slurries of these bases, especially aqueous sodium hydroxide solution, aqueous potassium hydroxide solution, and aqueous solutions or slurries of calcium hydroxide. Combinations of a plurality of bases may also be used.

It is frequently advantageous to use the guanidine compounds of the formula (I) as salts, since they are commercially available in that form and free guanidine compounds are in some instances sparingly soluble in water or lack stability in storage. When inorganic bases are used, they may be used in stoichiometric, substoichiometric, or superstoichiometric amounts, based on salts of guanidine compounds. Preference is given to using 10 to 100 equivalent % of inorganic base (based on salts of the guanidine compounds). The addition of inorganic bases has the consequence that, for microencapsulation, guanidine compounds having free $NH_2$ groups are available in the aqueous phase for reaction with the polyisocyanates in the oil phase. For microencapsulation, salts of guanidine compounds and bases are advantageously added separately to the aqueous phase.

Preference is given to using guanidine or salts of guanidine with carbonic acid, nitric acid, sulfuric acid, hydrochloric acid, silicic acid, phosphoric acid, formic acid, and/or acetic acid.

It is particularly advantageous to use salts of guanidine compounds with weak acids. These are in equilibrium with the corresponding free guanidine compound in aqueous solution as a consequence of hydrolysis. The free guanidine compound is consumed during the encapsulation process and is constantly regenerated according to the law of mass action. Guanidine carbonate exhibits this advantage to a particular degree. When salts of guanidine compounds with weak acids are used, there is no need to add inorganic bases to release the free guanidine compounds.

Useful guanidine compounds of the formula (I) for the present invention may also be prepared by ion exchange from their water-soluble salts according to the prior art using commercially available basic ion exchangers. The eluate from the ion exchanger can be neutralized directly for capsule wall formation by mixing it with the oil-in-water emulsion. Guanidine carbonate is most preferred.

For example, sufficient guanidine compound can be used so that 0.2 to 4.0 mol of free $NH_2$ groups are introduced into or released in the water phase in the form of guanidine compounds per mole of NCO groups present as polyisocyanate in the oil phase. This amount is preferably 0.5 to 1.5 mol. When guanidine compounds are used in a substoichiometric amount, free NCO groups remain after the reaction with the polyisocyanate. These then generally react with water, which is usually not critical since this reaction gives rise to new, free amino groups capable of crosslinking.

The guanidine compounds are preferably used in the form of aqueous solutions. The concentration of such solutions is not critical and is generally limited only by the solubility of the guanidine compounds in water. Useful aqueous solutions of guanidine compounds are 1 to 20% by weight in strength, for example.

Useful amines as an additional crosslinker component include polyamines in particular. Particular preference is given to aliphatic and/or cycloaliphatic amines possessing at least two primary and/or secondary amino groups.

The fraction of guanidine compound, especially guanidine carbonate, in the total amount of crosslinker is preferably 50 mol % or more.

Preferred amines have a molecular weight of less than 200 g/mol. Particularly preferred amines are hydrazine, ethylenediamine, diethylenetriamine, triethylenetetramine, tetraethylenepentamine, aminoethylpiperazine, propylenediamine, N-methyidipropylenetriamine, bis(3-aminopropyl)amine, hexamethylenediamine, and also 2,5-diamino-2,5-dimethylhexane.

The total molar amount of guanidine compound and amine crosslinker based on polyisocyanate is preferably 1.0 to 1.5 mol equivalents, especially 1.25 to 1.5 mol equivalents. Hence there is preferably at least one $NH_2$ group or NH group available per NCO group, not taking into account secondary reactions.

When mixtures of guanidine compounds and amines are used as a crosslinker, their total amount of primary or secondary amino groups can be determined arithmetically or analytically and set in relation to the NCO groups present in the oil phase: per mole of NCO groups present in the oil phase as a polyisocyanate, from 0.2 to 4.0 mol of NCO-reactive amino groups (primary or secondary) can be introduced into the water phase. The general rule is that one NCO group requires one primary or one secondary amino group to react. Secondary reactions are disregarded. When mixtures of guanidine compounds with amines are used, at least half (50 mol %) of the amino groups present in the mixture should be supplied by the guanidine compounds.

When technical grade polyamine mixtures, for example, boiling cuts and distillation residues, are used, they should have an analytically determinable acetyl number, expressed in mg of KOH/g of substance, greater than 500. Preference is given to diethylenetriamine, triethylenetetramine, and tetraethylenepentamine. Diethylenetriamine is particularly preferred.

Useful polyisocyanates for producing microcapsules according to this invention include a very wide range of aliphatic, aromatic, and aromatic-aliphatic difunctional and higher isocyanates, especially those known for producing microcapsules. Preference is given to using aliphatic polyisocyanates. Particular preference is given to using hexamethylene diisocyanate, isophorone diisocyanate, and/or derivatives of hexamethylene diisocyanate and of isophorone diisocyanate that have free isocyanate groups and contain biuret, isocyanurate, uretdione, and/or oxadiazinetrione structures. Mixtures of different polyisocyanates can also be used. Some useful polyisocyanates are described, for example, in EP-A 227,562, EP-A 164,666, and EP-A 16,378.

Polyisocyanates having an isocyanurate fraction are preferably aliphatic and cycloaliphatic polyisocyanates containing at least 30% by weight of an isocyanurate compound containing free isocyanate groups.

Polyisocyanates containing isocyanurate structures are in particular trimerized diisocyanates of the formula (I)

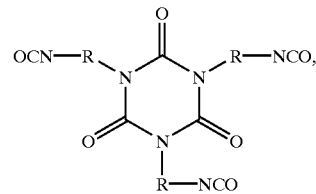

where
R is a divalent aliphatic or cycloaliphatic radical, especially a $C_1$-$C_{10}$ aliphatic radical or a $C_6$-$C_{10}$ cycloaliphatic radical, preferably $(CH_2)_6$,
and also their reaction products with a further 2n equivalents of diisocyanates of the formula OCN-R-NCO with isocyanurate formation, hereinafter referred to as oligomeric polyisocyanates containing isocyanurate groups. Preferably n is from 0 to 10, especially from 0 to 4. Preferably R is $(CH_2)_6$.

Preferably more than 50% by weight of all polyisocyanates (especially more than 80% by weight, particularly preferably more than 90% by weight, most preferably even more than 95% by weight) of all polyisocyanates have an isocyanurate structure.

In a further preferred embodiment, the fraction of isocyanurate of the formula I, especially where R is $(CH_2)_6$, is more than 30% by weight (especially more than 45% by weight), based on polyisocyanate. The fraction of oligomeric polyisocyanates, especially those based on the formula I where R is $(CH_2)_6$ and having an isocyanurate structure, is, based on polyisocyanate, preferably more than 20% by weight (especially more than 30% by weight).

The isocyanurate fractions (i.e., fractions of trimers and oligomers) of the polyisocyanate can generally be determined using gel permeation chromatography ("GPC").

Polyisocyanates containing uretdione groups are preferably hexamethylene diisocyanate oligomers having a uretdione structure. Of particular advantage are isocyanates comprising large fractions of the compound of the following structure:

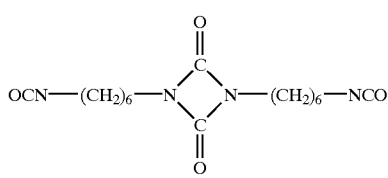
(II)

The fraction of the isocyanates of structure (II) can be, for example, at least 70% (preferably at least 75%) by weight of the isocyanate used and can be determined, for example, using gel permeation chromatography.

The industrial process of producing the isocyanate of structure (II) will generally also give rise to higher molecular weight fractions of addition products of the hexamethylene diisocyanate or of compounds possessing a different NCO linkage. Accordingly, the isocyanate to be used according to the invention may contain, for example, a minor amount (i.e., not more than 30%, preferably not more than 25%) by weight of compounds of the formula (I) where R is $(CH_2)_6$ and/or of the compound of the formula (III)

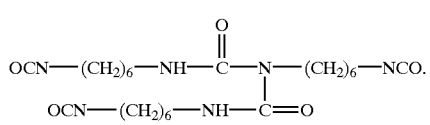
(III)

This is frequently the case when commercially available products are used.

These technical grade uretdione isocyanates, which predominantly contain the uretdione of hexamethylene diisocyanate (structure (II)), and their mixtures with other aliphatic and aromatic isocyanates surprisingly provide better processing to better quality microcapsules on crosslinking with guanidine compounds than when using isocyanates predominated by fractions of structures (I) and/or (III).

Uretdione-structured polyisocyanates or their mixtures with other aliphatic and/or aromatic isocyanates can be used, for example, in an amount of 1 to 25% by weight (preferably 3 to 15% by weight, particularly preferably 5 to 10% by weight), based on the total amount of the oil phase to be encapsulated.

Aliphatic biuret-structured polyisocyanates can be, for example, biuret-structured oligomers of hexamethylene diisocyanate. Of particular advantage are isocyanates containing large fractions, especially more than 70% by weight, of compounds of the formula (IV):

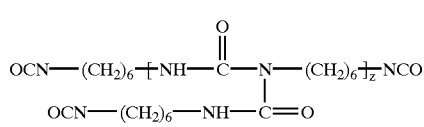
(IV)

where z is an integer from 1 to 10.

The industrial process of producing isocyanates of the formula (III) also gives rise, inter alia, to higher molecular weight fractions of addition products of hexamethylene diisocyanate or of compounds having a different NCO linkage. Accordingly, mixtures to be used according to the invention can also include a minor amount, for example, up to 20% by weight, of compounds of the formulas

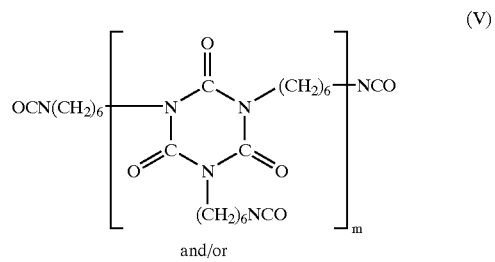
(V)

and/or

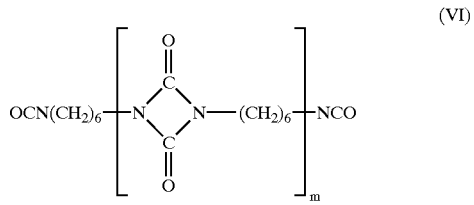
(VI)

where m is an integer from 1 to 10, which is frequently the case on using commercially available products.

Aliphatic biuret-structured polyisocyanates can be used, for example, in an amount of 3 to 15%, based on the total amount of the oil phase to be encapsulated.

The microcapsules of this invention may contain on the inside, dissolved in organic solvents, all those color formers that are commercially available according to the prior art for producing carbonless copy papers and that are known not to react with isocyanates. Examples are compounds of the type of the triphenylmethane compounds, diphenylmethane compounds, bisindophthalide compounds, bisarylcarbazolylmethane compounds, xanthene compounds, benzoxazine compounds, thiazine compounds, and spiropyran compounds, especially those which are known for use as color formers for producing carbonless copy papers. Mixtures of a plurality of color formers can also be used. Some useful color formers are described, for example, in EP-A 591,106, EP-A 315,901, EP-A 234,394, DE-A 3,622,262, and EP-A 187,329.

The microcapsules prepared according to this invention are useful in principle for encapsulating a multiplicity of chemically different compounds, provided such compounds are soluble in organic solvents and do not react with the isocyanates used or with the aminic crosslinkers or guanidine compounds. Examples are scents, aromas, adhesives, herbicides, pesticides, insecticides, catalysts, pharmaceuticals, and others.

Examples of organic water-immiscible and inert solvents that together with the material to be encapsulated and the polyisocyanate form part of the oil phase during the production of the microcapsules include aromatic, aliphatic, and naphthenic hydrocarbons, carboxylic esters, chlorinated paraffins, oils of animal and vegetable origin, natural fats having melting points in the range from 10° C. to 35° C., liquid fat derivatives, and aromatic and aliphatic ethers boiling above 100° C. Mixtures of a plurality of solvents can also be used.

Microcapsules according to the invention may be produced using an aqueous phase containing emulsifiers, stabilizers, and/or anticoalescers. Emulsifiers may also be present in the oil phase. The amount of such additives can be, for example, in the range 0.5-10% by weight, based on the respective phase.

The present invention may be carried out using, for example, solvents such as the alkylated aromatics, chloroparaffins, esters, low-melting natural fats and waxes, and natural oils and also low-alcohol esters derived from natural oils.

Preference is given to solvent mixtures of at least one compound selected from group I and at least one compound from group II. Group I solvents are alkylaromatics, such as diisopropyinaphthalenes, halogenated paraffins, such as chloroparaffin, natural fats and oils, such as coconut fat, and synthetically produced aliphatic or aromatic esters. Group II solvents are naphthenes (i.e., cycloaliphatic hydrocarbons) and also isoparaffins.

Preferably the proportion of group I solvent is at least 50% by weight, especially at least 70% by weight, particularly preferably at least 90% by weight, based on the total amount of organic solvent. The total amount of 100% can be made up in each case by one or more group 11 solvents.

Examples of group I solvents are the following classes of products, which each may also be used in the form of their isomeric mixtures: diisopropylnaphthalene such as KMC® 113 from Rütgers Kureha Solvents GmbH, alkylaromatics such as SURESOL® 290 from Koch Chemical Company or SURESOL® 300 from Koch Chemical Company, phenylxylethanes such as SAS® 296 from Nippon Soda Co. Ltd., or PXE from Daio Solvents, chloroparaffins such as Meflex® DA from Deutsche ICI GmbH, or Solvocaffaro® from Industrie Chimiche Caffaro S.p.A., or coconut fat such as Cocopur® from Walter Rau G.m.b.H.

Group II solvents include the following products: isoparaffins such as Exxsol® D 100 or NORPAR® or ISOPAR® from Deutsche EXXON CHEMICAL GmbH, or isohexadecane from Degussa-Hüls AG, or naphthenes such as Gravexe 913 from Deutsche Shell AG or Nytex® 800 and similar grades from Nynäs Naphthenics AB.

The invention also provides a process for producing the microcapsules of this invention comprising
(1) converting
  (a) an oil phase comprising polyisocyanates, at least one isocyanate-inert water-immiscible solvent, at least one compound to be encapsulated, and optionally further additives, and
  (b) a water phase comprising water, stabilizers, and optionally further auxiliaries,
    into an emulsion, preferably using a dispersing apparatus, and
(2) adding guanidine compounds and amines as crosslinkers to the emulsion.

Preferably the oil droplet size in the process is equal to the size of the microcapsules.

As the term is used herein, a stabilizer is a compound capable of preventing droplet coalescence and of reducing the surface tension between oil and water phases. Instead of one compound it is also possible to use a plurality of compounds each performing only one function.

A general preparative procedure will now be described by way of example. The individual components are described first.
Solution A Water containing 0.5 to 10% by weight of a protective colloid. The protective colloid may comprise partially hydrolyzed polyvinyl acetates, polyvinyl alcohol, carboxymethylcellulose and derivatives thereof, gum arabic, or protein hydrolysates. Preference is given to using an about 80% hydrolysed polyvinyl acetate in a concentration of 0.5 to 2.0% by weight. Suitable commercial products are, for example, Airvol® 523 from Air Products Nederland B.V. or Mowiol® 26-88 from Clariant (Deutschland) GmbH.
Solution B Solution of the compound or compounds to be encapsulated, especially of the color former, in a water-immiscible isocyanate-inert solvent such as, for example, diisopropyinaphthalene (such as KMC®-113 from Rütgers Kureha Solvents GmbH).

The concentration of the compound to be encapsulated, especially of the color former, in the solvent is preferably 3 to 15% by weight, based on the solution, depending on the solubility of the dyes and the desired depth of shade.
Component C Group II cosolvent used as an extender, for example, naphthenic hydrocarbons such as GRAVEX® 913 from Deutsche Shell AG or Nytex® 800 from Nynäs Naphthenics AB or isoparaffins such as Exxsole® D 100 from Deutsche EXXON CHEMICAL GmbH. Naphthenic oils are particularly suitable.
Component D The polyisocyanates to be used according to the invention. Preference is given here, for example, to hexamethylene diisocyanate isocyanurate having an NCO content of at least 10% by weight and an isocyanurate fraction of at least 30% by weight such as, for example, BAYMICRON® OXA WM 111, or hexamethylene diisocyanate biuret having an NCO content of at least 10% by weight and a biuret fraction of up to 80% by weight such as, for example, BAYMICRON® OXA WM 22, or hexamethylene diisocyanate uretdione having an NCO content of at least 15% by weight and a uretdione fraction of at least 60% by weight such as, for example, BAYMICRON® OXA WM 33 from Bayer AG, Leverkusen.
Solution E Demineralized water containing the guanidine compound, especially guanidine carbonate, and amines, especially aliphatic polyamines, in solution. Preference is given to using a solution having a water content of 80 to 90% by weight and a crosslinker content of 20 to 10% by weight.

The process of this invention can be operated continuously as well as batchwise.

Batchwise encapsulation is preferably effected by mixing component D with a corresponding amount of solution B and optionally with component C and adding the resultant solution to a corresponding amount of solution A with high speed stirring until a coarsely divided emulsion has formed. A commercially available high speed dispersing apparatus is then used to emulsify, preferably at temperatures below 40° C., until a finely divided emulsion having a droplet size equal to that of the desired microcapsules has formed.

The speed of the emulsifying apparatus is then reduced and solution E is added, preferably likewise at temperatures below 40° C., to start the formation of the capsule wall. The encapsulating reaction is then completed with moderate stirring, preferably by raising the temperature to 60 to 90° C., preferably at 70 to 80° C.

The result is an aqueous dispersion of the microcapsules according to the invention. The capsule fraction can be between 30 and 65% by weight (preferably 45 to 55% by weight) depending on the amounts and ratios of the input materials.

This form of batchwise encapsulation is procedurally in line with the prior art and does not require special technical measures.

A continuous encapsulation is preferably effected by continuously feeding the input solutions or components A, B, C, and D using suitable precision pumps to the emulsifying apparatus, solution B and component D preferably being premixed by means of commercially available static or dynamic mixers before they are combined with component C in a further static or dynamic mixer. This produces a homogeneous oil phase that contains the oil-dissolved color former, the polyisocyanate, and optionally the extender.

This oil phase is then combined with solution A, if necessary mixed once more, and pumped into the emulsifying apparatus. Suitable cooling means can be used to reduce the rise in temperature that occurs in the emulsifying apparatus due to shearing to an acceptable degree. The temperature is preferably controlled in such a way that a temperature of 25 to 40° C. is maintained in the emulsifying apparatus effluent. The finely divided emulsion emerging from the emulsifying apparatus is then continuously combined with solution E and mixed, which may likewise be effected using static or dynamic mixers or stirring elements.

The onsetting wall formation or encapsulation can then be selectively completed in a tank battery or in individual tanks. To this end, the temperature is raised in stages to 90° C. in a tank battery with stirring. The product emerging at the downstream end of the battery constitutes the finished microcapsule dispersion. When ripening is carried out in individual tanks, a sufficient number of tanks for the throughput has to be provided so that the first tank will be empty again when the filling of the last tank has ended (swinging). The heating of the individual tanks can advantageously—as in the case of the battery process—be effected by feeding low pressure steam directly into the product in a controlled manner. Here, too, the purely processing aspect is in line with the prior art.

The invention further provides carbonless copy papers comprising microcapsules according to the invention encapsulating a color former.

These copy papers may contain the microcapsules on one side only. Optionally the other side of the copy paper is coated with a developer (i.e., CFB paper).

Preferably the copy papers contain on one side not only the microcapsules according to the invention but also the developer (i.e., SC paper).

The invention further provides a set of copy papers coated with the microcapsules of the invention. This set is preferably characterized in that it has a layered construction made up of a topsheet, up to 10 intersheets underneath and a bottom sheet, in which the back of the topsheet (original) is coated with the microcapsules of the invention, the intersheets are coated with a developer on the front and with the microcapsules of the invention on the back, and the bottom sheet is coated with the developer on the front, the individual sheets being arranged in such a way that in each case the developer-coated side is next to the microcapsule-coated side, so that writing or printing on the topsheet original causes the micro-capsules of the sheets underneath to become crushed, thereby releasing the color former to combine with the developer of the contiguous side to form a color image of the topsheet.

The set preferably comprises up to 7, especially up to 4, intersheets.

Preferred developers are, for example, those of the clay type, of the phenolic resin type and of the zinc salicylate type.

The microcapsules of the invention, as well as similar performance characteristics to microcapsules produced using either only guanidine compounds or only amines, have the surprising advantage of substantially improved tightness as well as improved ageing stability for the SC papers produced therefrom.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all percentages are percentages by weight.

EXAMPLES

Test Methods

1. Tightness test
    Capsule tightness is determined as follows:
    a) preparation of a coating composition consisting of
        10.00 g of aqueous microcapsule dispersion containing 50% by weight of microcapsules according to the invention
        25.50 g of deionized water
        33.25 g of silica sol
    b) coating of a base paper
    c) drying of the coated paper
    d) reflectance measurements on coated and uncoated paper
    Procedure:
        A 47 g/m$^2$ DIN A4 format base paper is fixed with adhesive strips to a sheet of plastic 30×30 cm in size.
        Half the paper is coated with about 5 ml of the abovementioned coating composition on a lab coater having a 30 µm doctor blade and dried with hot air in the coating direction.
    a) Immediately after drying and
    b) after 2 hours of conditioning at 70° C. and 75% relative humidity, the reflectance of the coated and uncoated paper is measured using an Elrepho instrument.
The intensities of the colorations in % are calculated as follows:

(Reflectance value uncoated paper−reflectance value coated paper)/Reflectance value uncoated paper×100%

The lower the coloration of the coatings (i.e., low intensity values), the higher the capsule tightness.

The result is reported in terms of the intensity of the coloration in %

2. Determination of SC stability (SC means "self-contained")
    a) Production of SC paper:
        Preparation of coating composition consisting of
            65 g of aqueous capsule dispersion containing 50% by weight of microcapsules according to the invention
            103.7 g of water
            16 g of phenolic resin 55% in water (e.g. Schenectady HRJ 4002)
            12.8 g of cellulose spacers (e.g. Arbocell® BE 600/30)
            12.5 g of SBR latex (e.g., BAYSTAL® P 1600)
        Coating of a base paper
        Drying of the coated paper
    b) Thermal treatments of SC papers
    c) Reflectance measurements on treated and untreated SC papers Procedure:

A 47 g/m² DIN A4 format base paper is fixed with adhesive strips to a sheet of plastic 30×30 cm in size.
The paper is coated with the appropriate coating composition on a lab coater having a 40 μm doctor blade.
The target coating weight is 6 to 7 g/m².
The paper is dried with hot air in the coating direction.
Cooled paper is cut into strips about 5 cm in width that are subjected to the following treatment:
2 h at 120° C. in through circulation drying cabinet
4 h at 120° C. in through circulation drying cabinet Evaluation:

Reflectance measurements of coloration of SC layer using Elrepho photometer. The intensities of the colorations are measured in %, a low intensity value corresponds to low coloration.

Example 1

Biuret, Inventive

Production of Microcapsule Dispersion

Microcapsules for use in carbonless copy papers were produced by initially preparing an oil phase by dissolving 28.2 g of a color former mixture consisting of 65% of Pergascript® Black I-R, 5% of Pergascript® Blue SRB, 10% of Pergascript® Blue CVL, 5% of Pergascript® Orange I-G, and 15% of Pergascripte® Green I-2GN (powder) at 120° C. in 309.3 g of diisopropylnaphthalene (KMC® 113 from Rütgers Kureha Solvents GmbH) and mixing this solution at room temperature with 30 g of biuret polyisocyanate, NCO content 23.4% by weight, biuret fraction above 70% by weight (BAYMICRON® OXA WM 22; Bayer AG). 132.5 g of naphthenic isoparaffin mixture (Gravex® 913; Deutsche Shell AG) were added as an extender. This oil phase was combined with 442.3 g of a water phase consisting of an aqueous polyvinyl alcohol solution (5.3 g of Airvol® 532, Air Products in 437 g of water), the mixture was stirred to provide a coarse pre-emulsion and the coarse pre-emulsion was emulsified with a mixing siren (8,950 rpm) for 8 minutes to obtain a fine emulsion. The fine emulsion obtained was admixed at room temperature with an aqueous solution of 2.9 g of diethylenetriamine plus 3.8 g of guanidine carbonate in 52 g of deionized water, and the resultant mixture was heated to 60° C. over 1 hour with stirring and supplementarily stirred at 60° C. for 3 hours to form an approximately 51.2% strength microcapsule dispersion whose microcapsules had an average size of 6.8 μm. The tested performance characteristics are reported in the table.

Example 2

Biuret, Inventive

Example 1 was repeated except that a different ratio of an amine and a guanidine compound in the crosslinker mixture was used. The crosslinker solution used was 0.6 g of diethylenetriamine and 6.8 g of guanidine carbonate in 51 g of deionized water. The tested performance characteristics are reported in the table.

Example 3

Biuret, Comparative, Crosslinker: Amine Only

Example 1 was repeated except that the crosslinker solution consisted only of 5.73 g of diethylenetriamine in 52 g of deionized water. The measured performance characteristics are reported in the table.

Example 4

Biuret, Comparative, Crosslinker: Guanidine Compound Only

Example 1 was repeated except that the crosslinker solution consisted only of 7.52 g of guanidine carbonate in 50 g of deionized water. The measured performance characteristics are reported in the table.

Example 5

Uretdione, Inventive

Example 1 was repeated except that the color former solution used was 20 g of Kristallviolettlacton® in 440 g of diisopropylnaphthalene (KMC®-113). Instead of the biuret-containing polyisocyanate there was used a polyisocyanate having an above 60% uretdione fraction and an NCO content of 22.5% by weight (BAYMICRON® OXA WM 33 from Bayer AG). Unlike Example 1, however, no naphthenic isoparaffin mixture was used as an extender.

The crosslinker solution used was a mixture of 1.5 g of diethylenetriamine and 7.7 g of guanidine carbonate in 50 g of deionized water. For performance characteristics see the table.

Example 6

Uretdione, Comparative, Crosslinker: Amine Only

Example 5 was repeated except that an aqueous solution of 7.4 g of diethylenetriamine in 50 g of deionized water was used as crosslinker solution. For performance characteristics see the table.

Example 7

Uretdione, Comparative, Crosslinker: Guanidine Compound

Example 5 was repeated except that the crosslinker solution used was a solution of 9.65 g of guanidine carbonate in 49 g of deionized water. The properties are summarized in the table.

Example 8

Isocyanurate, Inventive

Example 1 was repeated except that the color former solution used was 20 g of Kristallviolettlacton® in 405 g of an alkylated biphenyl (Suresol® 290 Koch Chemicals). The extender used was 45 g of a naphthene (Nytex® 800) instead of Gravex® 913. Instead of the biuret-containing polyisocyanate there was used an isocyanurate-containing polyisocyanate having an NCO content of 21.8% by weight and an isocyanurate content of above 80%, based on polyisocyanate (BAYMICRON® OXA WM 111, Bayer AG).

The crosslinker used was a mixture of 0.54 g of diethylenetriamine and 6.3 g of guanidine carbonate in 51.2 g of deionized water. The properties are reported in the table.

Example 9

Isocyanurate, Comparative, Crosslinker: Amine

Example 8 was repeated except that the crosslinker used was 5.4 g of diethylenetriamine in 52.6 g of deionized water.

Example 10

Isocyanurate, Comparative, Crosslinker: Guanidine Compound Only

Example 8 was repeated except that the crosslinker used was 7.0 g of guanidine carbonate in 51 g of water.

TABLE

Evaluation of Examples 1 to 10

| Ex. | Example type | Isocyanate type | Crosslinker type*** | Solids content % | Mean capsule size μm | Tightness**** Before | 2 h 70° C./75% rel. humidity | Coloration of the SC layer**** 2 h 120° C. | 4 h 120° C. |
|---|---|---|---|---|---|---|---|---|---|
| 1 | Inventive | Biuret | DETA/GUCA 43:57 | 51.2 | 6.8 | 1.9 | 7.5 | 15.3 | 20.0 |
| 2 | Inventive | Biuret | DETA/GUCA 8:92 | 50.9 | 6.7 | 1.4 | 8.0 | 12.9 | 18.3 |
| 3 | Comparative | Biuret | DETA* | 51.1 | 6.8 | Coating not possible due to agglomeration | | | |
| 4 | Comparative | Biuret | GUCA** | 50.8 | 7.0 | 1.9 | 8.0 | 20.0 | 24.2 |
| 5 | Inventive | Uretdione | DETA/GUCA 16:84 | 52.0 | 5.9 | 1.8 | 6.5 | 10.9 | 14.4 |
| 6 | Comparative | Uretdione | DETA | 52.2 | 5.5 | Coating not possible due to agglomeration | | | |
| 7 | Comparative | Uretdione | GUCA | 52.2 | 5.9 | 1.9 | 9.7 | 18.2 | 28.0 |
| 8 | Inventive | Isocyanurate | DETA/GUCA 7.8:92.2 | 51.5 | 6.5 | 0.9 | 10.6 | 22.8 | 28.7 |
| 9 | Comparative | Isocyanurate | DETA | 51.9 | 6.3 | Coating not possible due to agglomeration | | | |
| 10 | Comparative | Isocyanurate | GUCA | 50.9 | 6.6 | 2.0 | 12.5 | 28.6 | 35.4 |

*DETA = diethylenetriamine
**GUCA = guanidine carbonate
***Weight ratio of crosslinker components is reported for mixtures
****The smaller the numerical value, the better the tightness and the higher the stability

What is claimed is:

1. Microcapsules having walls comprising reaction products of polyisocyanates with guanidine compounds and amines, wherein the polyisocyanates are uretdione-containing polyisocyanates comprising
(i) at least 70% by weight of a hexamethylene diisocyanate oligomer of the formula

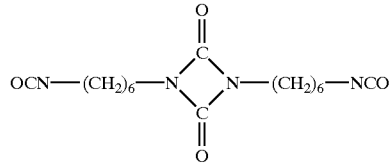

(ii) not more than 30% by weight of a compound of the formula

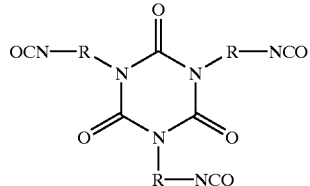

where R is $(CH_2)_6$
and/or
a compound of the formula

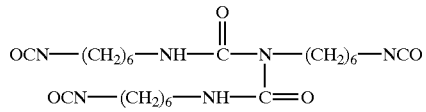

2. Microcapsules according to claim 1 wherein the guanidine compounds have the formula (I)

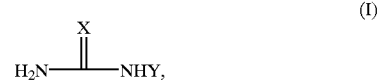

wherein

X is 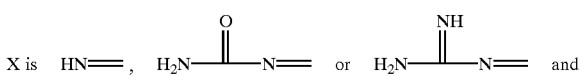 and

Y is 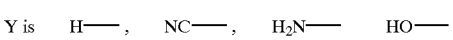

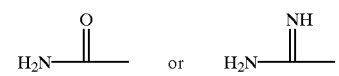

or their salts with acids.

3. Microcapsules according to claim 1 wherein the guanidine compounds are salts of guanidine with carbonic acid, nitric acid, sulfuric acid, hydrochloric acid, silicic acid, phosphoric acid, formic acid, and/or acetic acid.

4. Microcapsules according to claim 1 wherein the guanidine compound is guanidine carbonate.

5. Microcapsules according to claim 1 wherein polyisocyanates are aliphatic isocyanates containing at least 30% by weight of an isocyanurate having free isocyanate groups.

6. Microcapsules according to claim 1 wherein the amines are aliphatic and/or cycloaliphatic amines possessing at least 2 primary and/or secondary amino groups.

7. Microcapsules according to claim 1 wherein the guanidine compound comprises at least 50 mol % of the sum total of the guanidine compound and the amine.

8. Microcapsules according to claim 7 wherein the guanidine compound is guanidine carbonate.

9. A process for producing microcapsules according to claim 1 comprising
(1) converting
(a) an oil phase comprising polyisocyanates, at least one isocyanate-inert water-immiscible solvent, at least one compound to be encapsulated, and optionally further additives, and (b) a water phase comprising water, stabilizer, and optionally further auxiliaries, into an emulsion, and (2) adding guanidine compounds and amines as crosslinkers to the emulsion.

10. A process according to claim 9 wherein the guanidine compounds and amines are added to the emulsion using a dispersing apparatus.

11. Carbonless copy papers comprising microcapsules according to claim 1 encapsulating a color former.

* * * * *